United States Patent [19]

Malloy

[11] Patent Number: 4,829,487
[45] Date of Patent: May 9, 1989

[54] METHOD FOR RESTORING SEISMIC DATA USING CROSS-CORRELATION

[75] Inventor: Jeffrey E. Malloy, Carrollton, Tex.

[73] Assignee: Mobil Oil Corporation, New York, N.Y.

[21] Appl. No.: 191,108

[22] Filed: May 6, 1988

[51] Int. Cl.$^4$ .............................................. G01V 1/36
[52] U.S. Cl. ....................................... 367/40; 367/38; 364/421
[58] Field of Search ....................... 367/38, 39, 40, 42, 367/53, 63; 364/421

[56] References Cited

U.S. PATENT DOCUMENTS

| | | | |
|---|---|---|---|
| 4,203,161 | 5/1980 | Johnson et al. | 367/40 |
| 4,204,279 | 5/1980 | Parrack et al. | 367/40 |
| 4,218,765 | 8/1980 | Kinkade | 367/45 |
| 4,380,059 | 4/1983 | Ruehle | 367/46 |
| 4,594,693 | 6/1986 | Pann et al. | 367/43 |

OTHER PUBLICATIONS

S. Lawrence Marple, Jr., "Digital Spectral Analysis With Applications", 1987, pp. 43–46.

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

Method of restoring null traces in seismic records. A trace for which restoration of the data is desired, as well as adjoining traces on each side of the null trace are selected. A series of cross-correlations are determined for all points on the selected trace. Restoration of the data points is conducted by transforming the series of points of the adjacent traces corresponding to the maximum cross-correlation for the point into a Fourier representation, zero-padding the Fourier representation and producing a restored data point from the zero-padded data representation. The procedure is repeated for each point along the trace being restored. This procedure interpolates a trace between two original traces without altering the original data.

11 Claims, 5 Drawing Sheets

METHOD FOR RESTORING SEISMIC DATA USING CROSS-CORRELATION

BACKGROUND OF THE INVENTION

This invention relates to seismic exploration and more particularly, to a method for correctly restoring seismic traces using cross-correlation.

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced may be interpreted by geophysicists to detect the possible presence of valuable hydrocarbons.

Seismograms are most commonly recorded as digital samples which represent the amplitude of a received seismic signal as a function of time. Since seismograms are usually obtained along a line of exploration on the surface of the earth, the digital samples can be formed into x-t arrays with each sample in the array representing the amplitude of the seismic signal as a function of horizontal distance and time. When such array are visually reproduced, by plotting or the like, seismic sections are produced. A seismic section depicts the subsurface layering of a section of the earth. It is the principle tool which the geophysicist studies to determine the nature of the earth's subsurface formations. Before an array of seismic samples or traces can be converted into a seismic section for interpretation by geophysicists, the array must be extensively processed to remove noise and to make reflection events discernable.

A common problem during seismic data acquisition is the presence of seismic traces with no recorded data or seismic traces that clearly contain severe noise contamination. For example, the failure of one or more geophones intended to collect data can result in a seismic trace without data. Severe contamination, on the other hand, can result from numerous sources including random bursts of noise, multiple or intrabed reflections or ground roll.

Standard practice among geophysicists faced with seismic traces with no recorded data or severely contaminated seismic traces has been to exclude such traces, often referred to as "null" traces, from the otherwise satisfactory data set. The collected seismic data would be processed normally without the excluded data. When the missing trace was necessary for proper processing of the seismic data, prior attempts to restore the missing trace and create a trace with events consistent with nearby coherent events focused upon combining traces near the missing trace in the x-t domain to create the missing trace.

In the processing of seismograms, x-t arrays are sometimes transformed into arrays representing amplitude as a function of frequency and wave number. This is commonly referred to as a "frequency-wave number" or "f-k" transformation. In recent years the f-k transformation has proven useful as a tool for studying seismic data. F-k transforms are routinely used to represent seismic data collected by the aforementioned large arrays of sensors. Typically, the f-k representations are computed by Fast Fourier Transforms (hereafter referred to as FFTs). The resulting data representations are parameterized by frequencies, wave numbers (spatial frequencies), amplitudes and phases. In particular, for each frequency there is a collection of wave numbers, and for each frequency-wave number pair there is a complex number representative of an amplitude and a phase. Among various applications of this representation are spectra analysis (displaying the amplitude squared as a function of frequency and wave number) and filtering in the frequency-wave number domain.

In U.S. Pat. No. 4,218,765 issued to Kinkade, seismic traces are transformed to an f-k array. Filtering is then performed on the representations in the f-k domain. In U.S. Pat. No. 4,380,059 issued to Ruehle, multiple reflections are filtered from seismograms by transforming them into an f-k array representation of amplitude as a function of frequency and wave number. In Ruehle, the f-k array of the seismograms is filtered by weighting all the samples with the inverse of the f-k transform of the multiple reflections. In U.S. Pat. No. 4,594,693 issued to Pann et al, seismic trace interpolation is carried out by inserting zero amplitude traces between the seismic traces in a section where spatial aliasing is a problem. The traces are then transformed into an f-k array. The f-k array is filtered with a filter which rejects samples in a region of frequencies and wave numbers which exhibits aliasing. The filtered f-k array is then transformed into a seismic section representing amplitude as a function of time and distance.

SUMMARY OF THE INVENTION

It is an object of this invention to provide accurate estimations of seismic data acquired during the exploration of a subsurface formation when the original data cannot be utilized for seismic processing due to severe noise distortion.

It is another object of this invention to provide accurate estimations of seismic data lost during seismic exploration.

Still another object of this invention is to provide accurate estimations of seismic data having finer spacing between traces than the original seismic data acquired during exploration.

Exploration of a geophysical formation is conducted and a seismic record which comprises a plural number of seismic traces containing data related to the characteristics of the explored formation is produced. Often, the seismic record will also include at least one null trace containing missing or severely contaminated data for which restoration is desired. The traces adjoining the null trace or traces for which data restoration is desired are selected. Proceeding along the time axis of a selected "null" trace, each point of the trace is examined for restoration. For each selected point, a first dip angle (theta) is selected and the cross-correlation of the corresponding points of the adjoining traces along the line of the dip angle is determined. Cross-correlation of the selected data point with the corresponding points of the adjoining traces along the line of the dip angle is conducted for each dip value (theta) within a preselected range. Data points on the selected null trace and the adjoining seismic traces which correspond to the maximum cross-correlation for the range of dip angles are selected. The dip which maximizes the cross-correlation is considered the dip of maximum coherency. Data points on the adjoining traces along the dip of maximum coherency of the trace being restored define a series of values in the spatial domain. A FFT of the series of values is determined to produce a series of complex values representative of amplitude and phase with respect to spatial frequency. The frequency representation is zero padded in the frequency domain and the inverse transform of the zero-padded representation is determined. The resulting series contains the restored value for the selected point of the null trace. The procedure is repeated for each point along the null trace being restored to produce a new estimated seismic trace for replacing the "null" trace without altering the original data. The seismic record, which includes the restored trace, may then be displayed.

The above and other objects, advantages and features of the invention will be more readily understood from the following detailed description of the invention which is provided in connection with the accompanying drawings.

DESCRIPTION OF THE PREFERRED EMBODIMENT

Figure 1A:
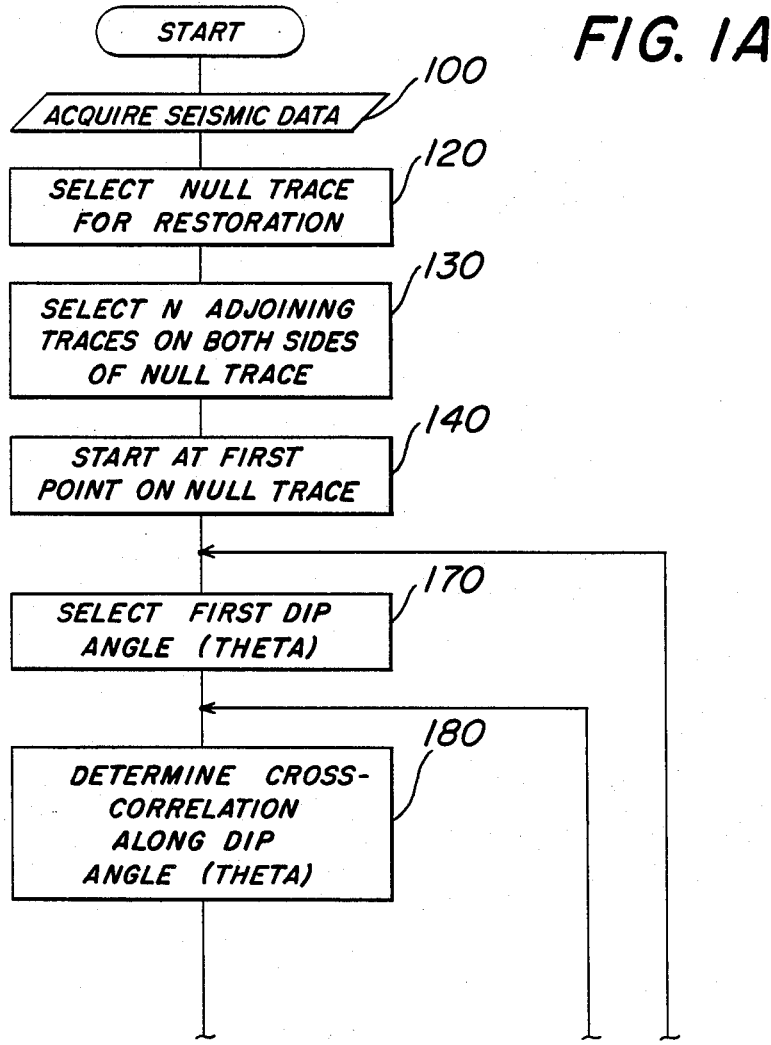
FIGS. 1a–b illustrate, in flow chart form, the method of seismic trace restoration of the present invention.
Figure 1B:
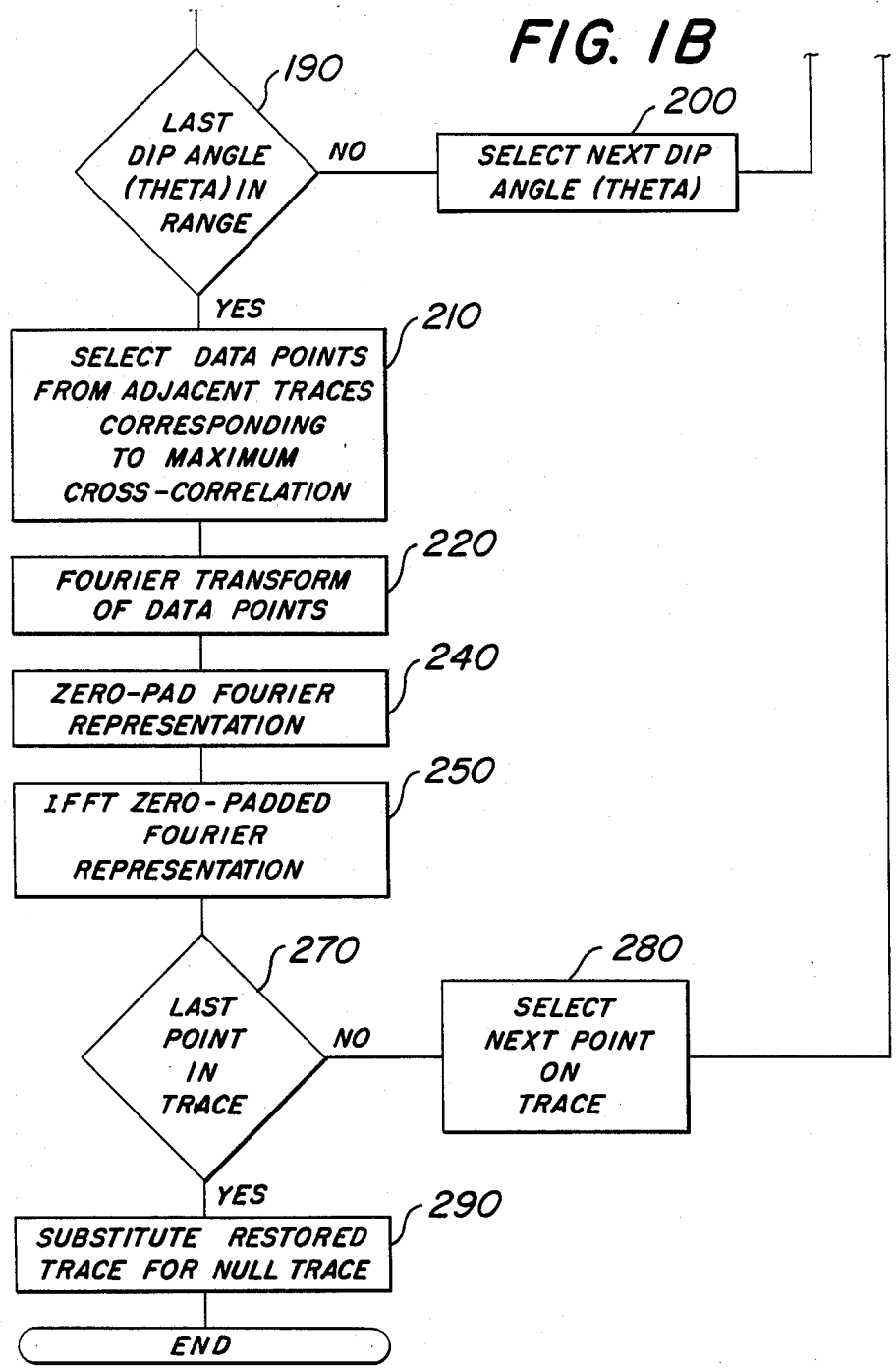
Figure 2A:
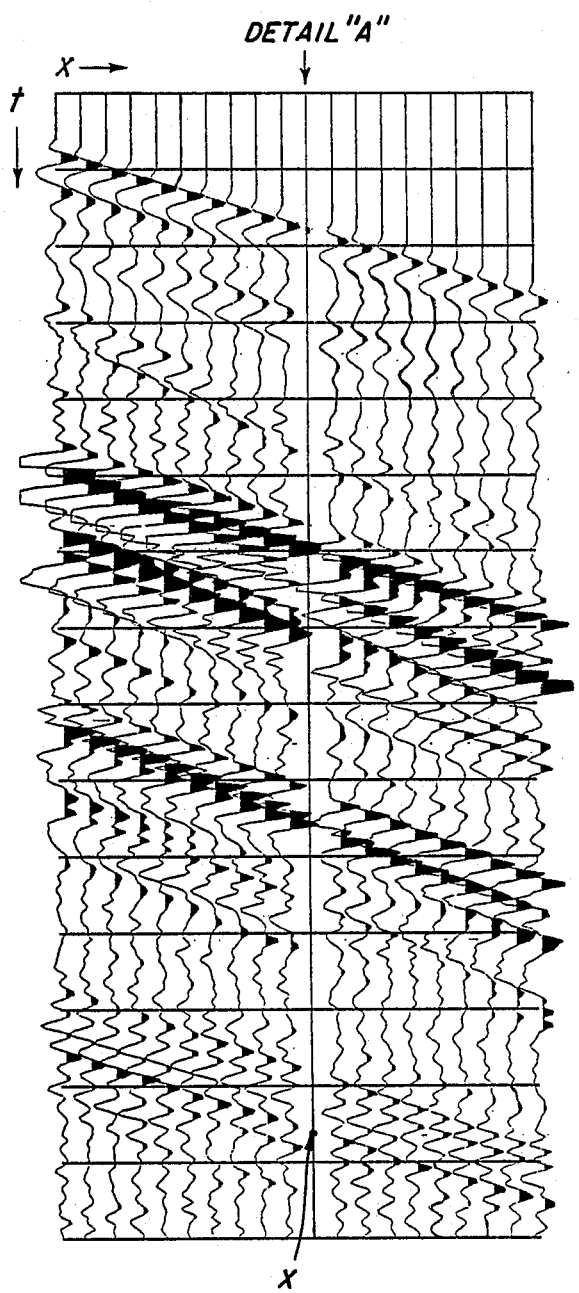
FIG. 2a illustrates an x-t domain of a shot record of a series of seismic traces including a missing or null trace for which restoration is desired.

Turning first to FIGS. 1a–b, the method of restoring seismic data using cross-correlation is hereby described. The method of the present invention commences at step 100 with the acquisition of seismic data using well-known seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. A series of seismic traces which make up a seismic record and which would be acquired by a typical seismic survey may be seen by reference to FIG. 2a. The seismic traces depicted in FIG. 2a represent the amplitude of seismic reflections as a function of time and distance along the line of exploration in the x direction of the earth's surface. These traces have been gathered into an x-t array commonly referred to as a "seismic section" or "seismic record". The gathered seismic data may include a number of "null" traces which have either no recorded data or which clearly contain severe contamination. For example, in FIG. 2, detail "A" is indicative of a null trace where no seismic data has been recorded.

Proceeding to step 12, a null trace is selected for restoration. At step 130, N traces adjoining a null trace on each side are selected. The value of N used depends primarily on the coherency of seismic events which surround the null trace. The greater the coherency of the acquired data, the lesser number of N adjoining traces need be selected. While the number N of adjoining traces surrounding the missing or null trace will vary among recorded data sets, a selection of the immediately adjoining trace on each side of the "null" trace (i.e. N=1) will provide a satisfactory result for most seismic records which include coherent events.

Proceeding to step 140, examination of the "null" trace being restored commences by selected a first point along the time axis of the "null" trace. If the point is located along the line of a coherent event, restoration of the null point proceeds at step 170. For example, FIG. 2a shows null point "x" along the line of a coherent event. At step 170, the determination of the maximum cross-correlation for the selected point of the null trace commences by the selection of a first dip angle (theta) for the selected point.

Figure 2B:
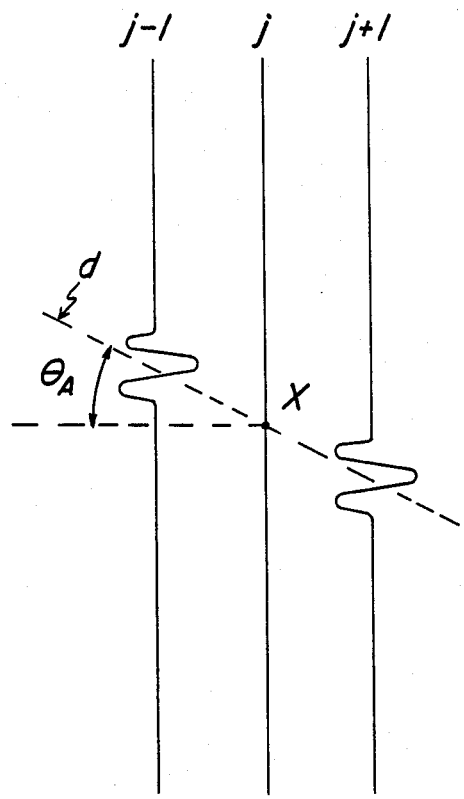
FIG. 2b illustrates a first enlarged view of a null trace and selected adjoining traces
Figure 2C:
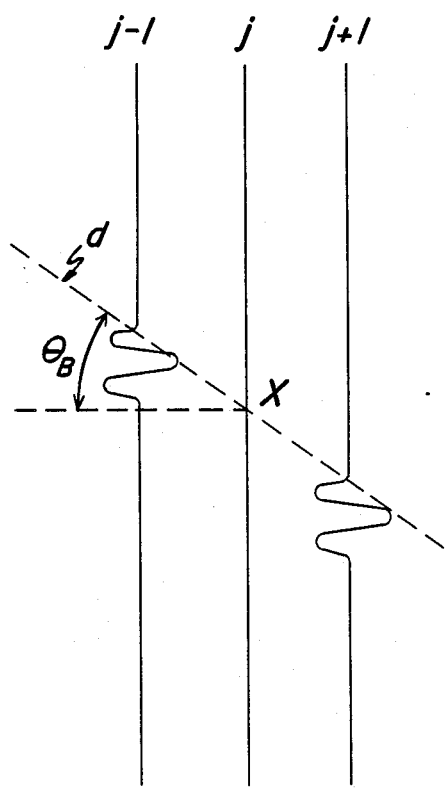
FIG. 2c illustrates a second enlarged view of a null trace and selected adjoining traces where the selected dip angle is the dip of maximum coherency.
Figure 3:
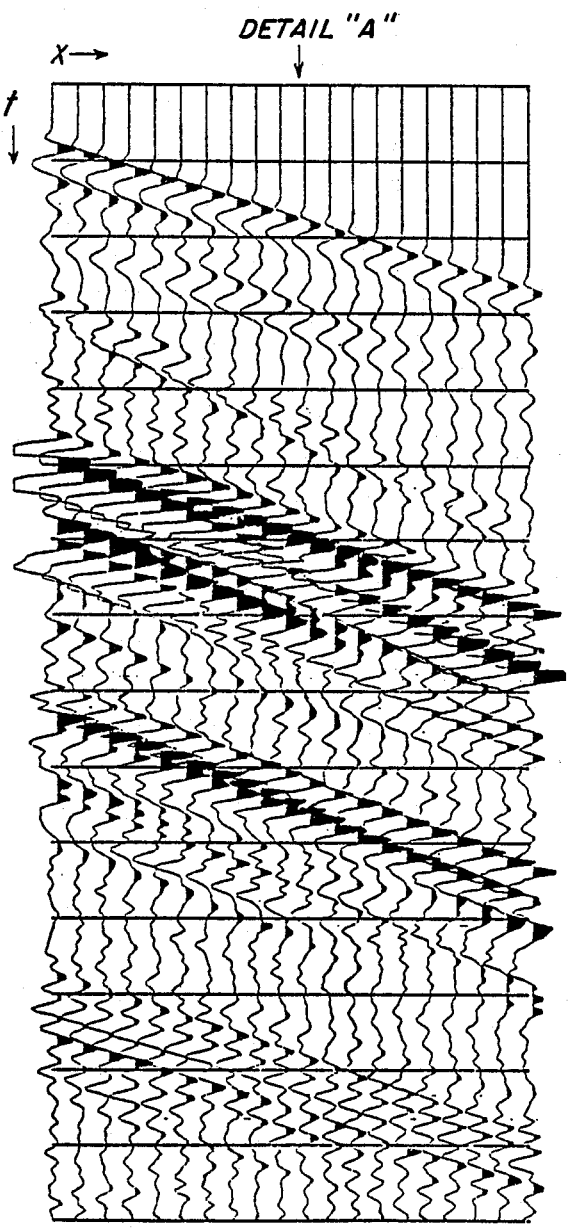
FIG. 3 illustrates the x-t domain shot record of FIG. 2a with the missing or null trace restored according to the method of FIGS. 1a–b.

Referring next to FIGS. 2b–c, the method of determining the maximum cross-correlation for the selected data point set forth as step 170 may be more clearly understood. Line "d" of FIG. 2b passes through point x of the null trace as well as the portions of the coherent event of the adjoining traces. Dip angle (theta)$_A$ is the angle between a line parallel to the x axis which passes through point x of the null trace and line "d". Dip angle (theta)$_A$ may be any angle within a selected dip angle range. The selected dip angle range may be determined based on a number of variables such as the window width (displacement between trace sought to be restored or interpolated and the adjacent traces) as well as characteristics of the coherent events such as amplitude of event or displacement of event along the time axis. Typically, the dip angle is expressed in terms of a time shift per trace. For the given example, a dip range of 10–60 would provide satisfactory results. Preferably, the selected dip range should be the minimum range which would include the angle of maximum cross-correlation. Turning next to FIG. 2c, a dip angle (theta)$_B$ corresponding to the maximum cross-correlation between the adjoining traces for the selected point of null trace may be seen.

Returning now to FIGS. 1a–b, the method of the present invention continues by proceeding to step 180 where the cross-correlation for the selected point on the null trace and the points on the adjoining traces is determined. The cross-correlation for the selected dip angle (theta) is related to the amplitude of the points on the adjacent traces along the dip line. Proceeding to step 190, if there are remaining dip angle (theta)s within the dip angle range, a next dip angle (theta) is selected at step 200 and the cross-correlation of the adjoining traces for the next dip angle is calculated at step 180. If it is determined at step 190 that the cross-correlation has been determined for all values of dip angle (theta) for the selected dip range, the data points from adjacent traces corresponding to the maximum cross-correlation is determined at step 210. As shown in FIG. 2c, the maximum cross-correlation occurs at the dip line which includes the points of greatest amplitude on the adjacent traces.

Proceeding to step 220, the series of points of the selected adjacent traces which correspond to the maximum cross-correlation are Fast Fourier Transformed (or FFT'd) into the spatial frequency domain. For each data point x(t), the Fourier transform is defined as:

$$X(f) = \text{SUM}[x(t) \cdot e^{(-j2\pi kn/N)}], \text{ for } k=0, 1, \ldots, N-1 \quad (1)$$

Where:

X(f) is the amplitude or Fourier spectrum of x(t);

N is the number of input traces; and the sum is over n=0, 1, 2, ..., N−1.

The product of the first FFT of the series of data points corresponding to maximum cross-correlation produces a series of complex values representative of amplitude and phase with respect to frequency.

The Fourier transform of the data series is then zero-padded at step 240. Preferably, the number of zeros to be padded should be equal to the number of adjoining traces N used for interpolation. Here, as the number of adjoining traces used for interpolation is two, a two zero-pad should be used. A zero-pad of the transform of the data series may then be expressed as:

$$X(f) = SUM[X(f) * e^{(-j2\pi nk/2N)}] \text{ for } k=0, 1, \ldots, N-1$$

where: the sum is over n=0, 1, 2, ..., 2N−1

Proceeding to step 250, the zero-padded fourier representation of the data series is Inverse Fast Fourier Transformed (IFFT) to provide a series of values in the x-t time domain. These values include a restored value which may be used in place of the selected point of the null trace.

If it is determined at step 270 that there are additional data points of the null trace for which restoration is needed, the next point on the null trace is selected at step 280, followed by a return to step 150 for further processing. If the new data point determined by the above method is the last data point of the null trace to be restored, the method of the present invention proceeds to step 290 where the new restored data points are substituted for the original data points of the null trace to provide a restored trace. The seismic record including the restored trace may then be displayed or otherwise analyzed to provide useful information regarding the explored formation.

Thus, there has been described and illustrated herein methods for restoring seismic traces using cross-correlation techniques. However those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. In seismic exploration wherein seismic sources are activated at spaced locations along line of exploration and the amplitude of reflections are recorded as a function of time along said line to produce a series of seismic traces, said series of seismic traces including at least one null trace, a method of restoring seismic data for said at least one null trace comprising the steps of:
   selecting a null trace for restoration;
   selecting at least one seismic trace adjoining each side of said selected null trace;
   selecting a first point on said null trace for restoration;
   selecting a data point on each of said at least one adjoining traces to produce a data series, said data points corresponding to a maximum cross-correlation between said null trace and said adjoining traces;
   producing a Fourier representation for said data series;
   zero-padding said Fourier representation;
   producing a restored data point from said zero-padded Fourier representation
   selecting a next point on said null trace for restoration; and
   repeating the steps of selecting a data point on each of said adjoining traces to produce a data series, producing a Fourier representation for said data series, zero-padding said Fourier representation, producing a restored data point from said zero-padded Fourier representation and selecting next point on said null trace for restoration until all data points on said null trace have been restored.

2. The method according to claim 1 wherein the step of selecting at least one seismic trace adjoining each side of said null trace further comprises the steps of:
   examining said seismic record for coherent events surrounding said null trace;
   selecting a value N based on the coherency of said seismic record; and
   selecting N seismic traces adjoining each side of said null trace.

3. The method according to claim 1 wherein the step of selecting a data point on each of said adjoining traces to produce a data series further comprises the steps of:
   selecting a plurality of dip angles;
   determining a cross-correlation for said null trace and said adjoining traces for each of said dip angles; and
   selecting said data series corresponding to a maximum cross-correlation between said null trace and said adjoining traces for said plurality of dip angles.

4. The method according to claim 1 wherein the step of producing a restored data point from said zero-padded Fourier representation further comprises the steps of:
   transforming said zero-padded Fourier representation into a next data series; and
   selected a point from said next data series corresponding to said selected point of said null trace.

5. In seismic exploration wherein seismic sources are activated at spaced locations along a line of exploration and the amplitude of reflections are recorded as a function of time along said line to produce a series of seismic traces, said series of seismic traces including at least one null trace, a method of restoring seismic data for said at least one null trace comprising the steps of:
   selecting a null trace for restoration;
   selecting at least one seismic trace adjoining each side of said selected null trace;
   selecting a first point on said null trace for restoration;
   selecting a plurality of dip angles;
   determining a cross-correlation for said null trace and said adjoining traces for each of said dip angles;
   selecting the dip angle corresponding to the maximum cross-correlation between said null trace and said adjoining traces for said plurality of dip angles;
   producing a data series comprising points on said adjoining traces corresponding to the dip angle having the maximum cross-correlation;
   producing a Fourier representation for said data series;
   zero-padding said Fourier representation;
   producing a restored data point from said zero-padded Fourier representation;
   selecting a next point on said null trace for restoration; and repeating the steps of producing a data series comprising points on said adjoining traces corresponding to the dip angle having the maximum cross-correlation, producing a Fourier representation for said data series, zero-padding said Fourier representation, producing a restored data point from said zero-padded Fourier representation and selecting a next point on said null trace for restoration until all data points on said null trace have been restored.

6. The method according to claim 5 wherein the step of selecting at least one seismic trace adjoining each side of null trace further comprises the steps of:
  examining said seismic record for coherent events surrounding said null trace;
  selecting a value N based on the coherency of said seismic record; and
  selecting N seismic traces adjoining each side of said null trace.

7. The method according to claim 5 wherein the step of producing a restored data point from said zero-padded Fourier representation further comprises the steps of:
  transforming said zero-padded Fourier representation into a next data series; and
  selected a point from said next data series corresponding to said selected point of said null trace.

8. A method of restoring seismic data at a point along a null trace included as part of a series of seismic traces comprising the steps of:
  activating seismic energy at spaced locations along a line of exploration;
  recording the amplitude of reflections as a function of time along said line to produce a series of seismic traces, said series of seismic traces including at least one null trace,
  selecting at least one seismic trace adjoining each side of said null trace;
  selecting a data point on each of said adjoining traces to produce a data series, said data point corresponding to a maximum cross-correlation between said null trace and said adjoining traces;
  producing a Fourier representation for said data series;
  zero-padding said Fourier representation; and
  producing a restored data point from said zero-padded Fourier representation.

9. The method according to claim 8 wherein the step of selecting a data point on each of said adjoining traces to produce a data series further comprises the steps of:
  selecting a plurality of dip angles;
  determining a cross-correlation for said null trace and said adjoining traces for each of said dip angles; and
  selecting said data series corresponding to a maximum cross-correlation for said plurality of dip angles.

10. The method according to claim 8 wherein the step of selecting at least one seismic trace adjoining each side of said null trace further comprises the steps of:
  examining said seismic record for coherent events surrounding said null trace;
  selecting a value N based on the coherency of said seismic record; and
  selecting N seismic traces adjoining each side of said null trace.

11. The method according to claim wherein the step of producing a restored data point from said zero-padded Fourier representation further comprises the steps of:
  transforming said zero-padded Fourier representation into a next data series; and
  selected a point from said next data series corresponding to said selected point of said null trace.

* * * * *